May 16, 1939.     J. P. EASTMAN     2,158,620
COUPLING
Filed May 21, 1937     2 Sheets-Sheet 1
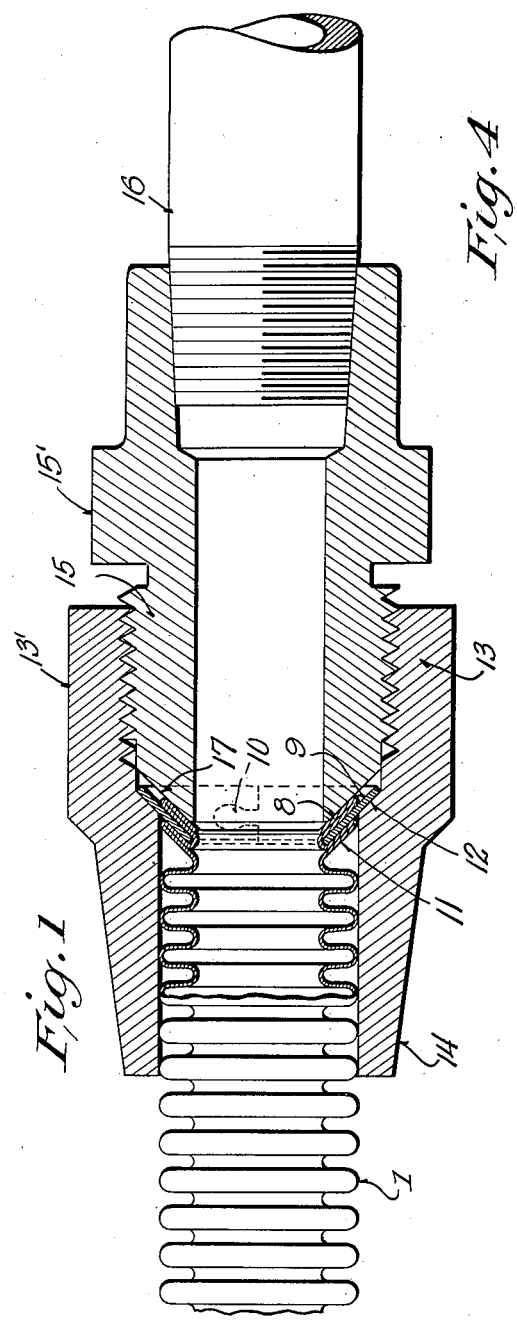
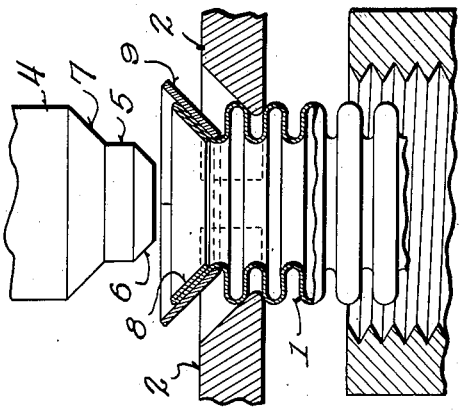
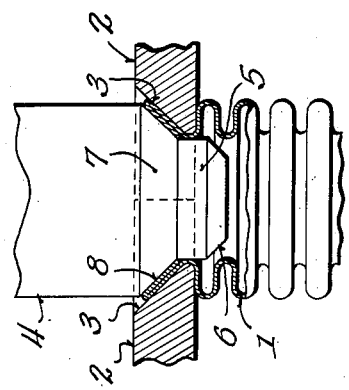
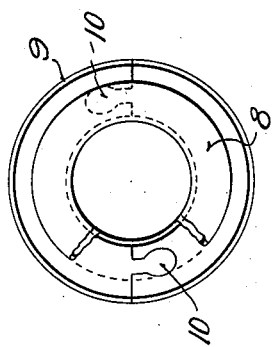
INVENTOR.
JOSEPH PETER EASTMAN
BY
ATTORNEY.

May 16, 1939.  J. P. EASTMAN  2,158,620
COUPLING
Filed May 21, 1937  2 Sheets-Sheet 2

INVENTOR.
JOSEPH PETER EASTMAN
BY
ATTORNEY.

Patented May 16, 1939

2,158,620

UNITED STATES PATENT OFFICE 2,158,620

COUPLING

Joseph Peter Eastman, Manitowoc, Wis.

Application May 21, 1937, Serial No. 143,899

4 Claims. (Cl. 285—86)

This invention relates to couplings and is particularly directed to a coupling construction for seamless metal tubing and to the method of making it.

Seamless metal tubing is frequently provided for relatively low pressures, though the invention is not to be limited to any specific pressure, and it is customary to form this seamless metal tubing with relatively thin walls which have a series of bellows-like folds projecting inwardly and outwardly, to thereby provide great flexibility for this seamless metal tubing. However, difficulty has been encountered when it is attempted to attach a coupling member to the end of the seamless metal hose so that the hose may be attached to or detached from any other cooperating coupling member.

Objects of this invention are to provide a coupling construction for seamless flexible metal tubing which will not crush or damage the tubing, which provides an accurate gas-tight and liquid-tight seat, which is readily detachable, and which reenforces the tubing adjacent the seat, and which is so constructed that bending of the flexible tubing immediately adjacent the seat with consequent deformation of the seat is prevented.

Further objects are to provide a coupling construction which though primarily applicable to seamless flexible metal tubing, nevertheless may be applied to other types of metal tubing, particularly those that have thin, easily damaged walls, and which is so constructed that a reenforcing member or reenforcing means is provided for reenforcing the seat which is formed on the metal tubing, the reenforcing member forming supporting means for the reenforced seat so that the seat is supported from one of the coupling members and the coupling member is thereby allowed to slip freely over the tubing to not only correctly position the seat but also to protect the immediately adjacent portion of the tubing from distortion, so that an accurate seat is maintained, the construction including a readily detachable cooperating coupling member which may be screwed into place and which will accurately conform to the reenforced seat.

Further objects are to provide a coupling construction for seamless flexible metal tubing which is so made that a simple construction of coupling may be employed and in which an easily produced and reliable type of seat is provided and formed on the flexible metal tubing itself, the coupling member being freely mounted so that it may swivel on the flexible metal tubing.

A further object is to provide a method of forming a seat on the end of flexible metal tubing of bellows-like formation having a series of inward and outwardly directed folds.

In greater detail, a further object of this invention is to provide a method of forming a seat on the end of flexible metal tubing of bellows-like formation having a series of inward and outwardly directed folds by the use of a die and punch, or in any other suitable manner, the invention in its broadest aspect contemplating not only the die forming of a seat on the end of a flexible metal tube but also the forming of this seat in any other manner, as by spinning, though the specific method of forming the seat by spinning forms the subject matter of my copending application for Coupling construction, Serial No. 143,874, filed May 21, 1937.

Embodiments of the invention are shown in the accompanying drawings, in which:

Figure 1 is a longitudinal sectional view through one form of the coupling construction.

Figure 2 is a view, with parts broken away, of the end of the flexible metal tubing with the seat formed thereon.

Figure 3 is a view, partly in section, showing one step in the process of forming the seat.

Figure 4 is a view showing a further step in the process of forming the seat.

Figure 9:
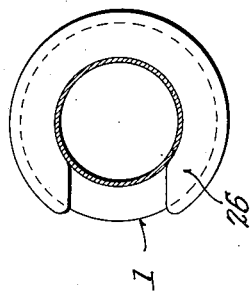
Figure 9 is a sectional view on the line 9—9 of Figure 7, the locking ring, however, being shown in full.
Figure 8:
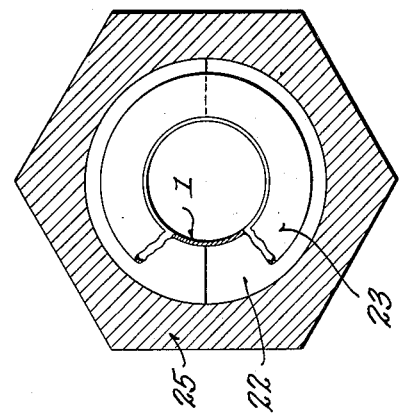
Figure 8 is a sectional view, partly broken away, on the line 8—8 of Figure 7.

Referring to Figures 1 and 2, which show one form of the invention, and to Figures 3 and 4, which show steps in the process of forming the device, it will be seen that the flexible metal tubing comprises a metal tube 1 which is of bellows-like construction and has a series of inwardly and outwardly projecting folds.

In practicing the invention the outermost fold is shaped to provide a seat. As shown in Figures 1, 3 and 4, the seat may be conical. A convenient way of forming this seat is to provide a punch or press arrangement in which a pair of side jaws 2 having rounded noses provided with conical surfaces 3 are adapted to move inwardly between the outermost fold and the next succeeding fold and thus to deflect the outermost fold upwardly. After the jaws 2 have moved laterally inwardly to encircle the flexible metal tubing, the punch member 4 moves downwardly and its central plunger 5, which may be bevelled at its outer end as indicated at 6, enters the interior of the flexible metal tubing while the bevelled face or conical face 7 engages the outermost fold and flattens it so as to provide a double or two-thickness seat portion 8 of conical contour. Thereafter the plunger or punch member 4 rises and the jaws 2 move apart. A conical reenforcing member or two-part ring 9 is positioned below the seat portion 7 between such seat portion and the next adjacent fold. In the form of the invention now being described, the reenforcing ring 9, as may be seen from Figure 2, is provided with interlocking portions, as for example the ears 10, which fit within corresponding apertures to thus interlock the two parts of the reenforcing ring.

When the ring is thus assembled, the jaws 2, see Figure 4, move inwardly and thus turn the next adjacent fold upwardly and the punch member 4 descends. This flattens the next adjacent fold below the reenforcing ring 9 so that the parts are then in the form shown in Figure 1 with the next adjacent fold flattened, as indicated at 11 in Figure 1, and thus locking the ring between the adjacent flattened portions 8 and 11 and preventing disengagement of the elements of the ring from each other and also rigidly locking the ring between the successive flattened folds.

In this manner a reenforced seat is provided on the flexible metal tubing 1 and additionally it is to be noted from Figure 1 that the reenforcing ring 9 projects beyond the periphery of the flexible metal tubing 1 and thus forms a supporting member which is received on the annular inwardly projecting shoulder 12 of the tubular coupling member 13. This tubular coupling member has a rearwardly projecting sleeve like portion 14 which loosely fits over several of the succeeding folds of the flexible metal tubing and thus prevents distortion of the seat portion formed on the tubing due to subsequent flexing of the tubing, as that portion of the tubing immediately adjacent the seat is held against bending.

The tubular coupling member is preferably internally threaded and receives the externally threaded cooperating coupling member 15. These coupling members 13 and 15 may be provided with polygonal faces 13' and 15' so that they may be readily screwed together. If desired, the coupling member 15 may be screwed upon a pipe or other member 16, as shown in Figure 1.

It is apparent, therefore, that if for instance the coupling member 15 is rigid upon the pipe 16, as will usually be the case, that it is a simple matter to screw the coupling member 13 onto the coupling member 15, as the tubular coupling member 13 freely swivels upon the flexible metal tubing and thus draws the seat into contact with the conical seat portion 17 formed on the end of the coupling member 15. A very accurate tight seating is obtained in this simple manner without any danger of damaging the flexible metal tubing while it is being either coupled or uncoupled, and it is apparent that such flexible metal tubing may be readily coupled and uncoupled.

It is to be understood that while it is preferable to form a double fold at the seat portion 8, that it is within the province of this invention to form this seat portion of a single fold, if so desired.

The flexible metal tubing may carry a locking member, not shown in Figure 1 but described hereinafter, to prevent longitudinal displacement of the tubular coupling member 13 thereon when such coupling member is detached from the cooperating coupling member 15.

Figure 5:
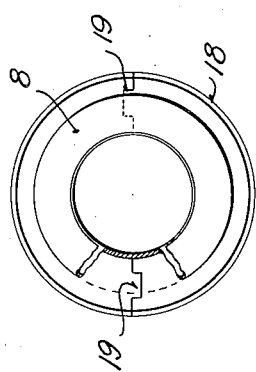
Figure 5 is a view corresponding to Figure 2 showing a further form of seat construction.

It is apparent that other forms of interlocking may be provided for the split ring or reenforcing ring 9. For example, as shown in Figure 5, the reenforcing ring 18 instead of being provided with rounded tongues interlocking in corresponding holes may be provided with rectangular tongue portions 19, as it is obvious that after the ring is locked in place on the tubular member by the flattening of successive folds that the reenforcing ring will be held firmly locked to the flexible metal tubing.

Figure 6:
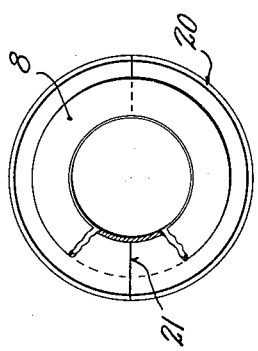
Figure 6 is a further form of seat construction, such view corresponding to Figure 2.

Also it is within the province of this invention to dispense with the interlocking between the two portions of the multiple element reenforcing ring. For example as shown in Figure 6, the reenforcing ring 20 may have no interlocking portions but may have merely flat abutting faces 21.

Figure 7:
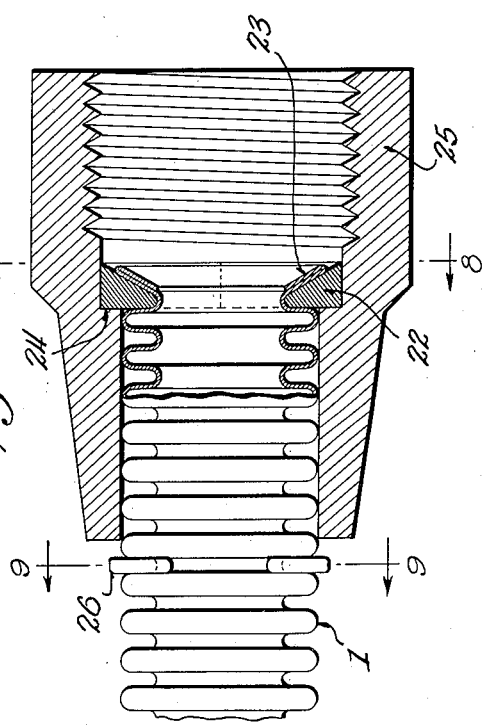
Figure 7 is a sectional view through a coupling construction showing a modification of that illustrated in Figure 1.

As shown in Figure 7, it is also possible to provide a reenforcing ring or supporting ring 22 which is not permanently locked to the flexible metal tubing 1 but instead which is provided with a tapered upper portion upon which the conical seat 23 formed by flattening the outermost fold of the flexible metal tubing 1 rests and by means of which it is supported. This reenforcing ring or split ring 22 is merely slipped into place and rests upon an abrupt shoulder 24 formed on the coupling member 25.

It is apparent that if the coupling member 25 is slipped along the flexible metal tubing, that the split ring 22 will fall apart and drop out of place. Therefore it is preferable in this form of the invention to provide some form of locking member. For example, the locking ring 26 may be positioned between adjacent folds of the flexible metal tubing just beyond the inner end of the coupling member 25. This locking ring may, for example, take the form as shown most clearly in Figure 9.

This construction also, as in the previous construction, swivelly joins the tubular coupling member 25 to the flexible metal tubing 1 and provides a reenforced seat which may be of conical shape if desired and which cooperates with a correspondingly shaped cooperating coupling member not shown in Figure 7 but similar to that shown in Figure 1.

Although the seat portion has been shown as conical, it is to be understood that it is within the province of this invention to form the seat portion flat as well as conical, or if it is found desirable, it is obviously also within the province of this invention to form the seat portion spherical.

It is apparent that there is no danger of tearing the flexible metal tubing during the operation of coupling or uncoupling it. Instead the tubular coupling member merely freely swivels on the flexible metal tubing and presses the seat portion formed on such tubing tightly and securely against the corresponding seat portion formed on the cooperating coupling member.

Also, as will be noted from Figures 1 and 7, the reenforcing ring for the seat portion not only reenforces the seat portion but also forms a supporting member so that the seat portion is supported from the internally arranged annular shoulder of the tubular coupling member.

It will be seen also that the process of forming the coupling construction is very simple and may be rapidly performed and is an inexpensive process to follow.

Although this invention has been described in considerable detail, it is to be understood that such description is intended as illustrative rather than limiting, as the invention may be variously embodied and is to be interpreted as claimed.

I claim:

1. A coupling construction comprising a flexible metal hose having a series of annular bellows-like outwardly and inwardly projecting folds, said hose having the outermost of said folds shaped to provide a smooth surface seat portion, a tubular coupling member encircling the end of said hose and having an annular internal shoulder supporting said seat, an annular reenforcing member surrounding said hose adjacent the end thereof and reenforcing said seat portion, said annular reenforcing member being formed of a plurality of portions, means for holding said portions together independently of said tubular coupling member, and a second coupling member screwed into said tubular coupling member and having an end seating upon said seat.

2. A coupling construction comprising a flexible metal hose having a series of annular bellows-like outwardly and inwardly projecting folds, each fold forming a continuous closed ring about the hose, a rigid annular reinforcing member surrounding said hose adjacent the end of said hose, said hose having an outer portion on the outer side of said annular reinforcing member flattened to form a seat and having an inner fold on the inner side of said annular reinforcing member flattened against said annular reinforcing member to hold said annular reinforcing member clamped between the two flattened portions of said hose, said annular reinforcing member projecting beyond the outline of said hose and forming a supporting portion, a tubular coupling member encircling the end of the hose and having an annular internal shoulder directly engaging the supporting portion of said annular reinforcing member to thereby support said annular reinforcing member, and a second coupling member screwed into said tubular coupling member and having an end directly engaging and seating upon the outer flattened portion of said hose.

3. A coupling construction comprising a flexible metal hose having a series of annular bellows-like outwardly and inwardly projecting folds, each fold forming a continuous closed ring about the hose, a rigid annular reinforcing member surrounding said hose adjacent the end of said hose, said annular reinforcing member being formed of portions interlocking with each other, said hose having an outer portion on the outer side of said annular reinforcing member flattened to form a seat and having an inner fold on the inner side of said annular reinforcing member flattened against said annular reinforcing member to hold said annular reinforcing member clamped between the two flattened portions of said hose, said annular reinforcing member projecting beyond the outline of said hose and forming a supporting portion, a tubular coupling member encircling the end of the hose and having an annular internal shoulder directly engaging the supporting portion of said annular reinforcing member to thereby support said annular reinforcing member, and a second coupling member screwed into said tubular coupling member and having an end directly engaging and seating upon the outer flattened portion of said hose.

4. A coupling construction comprising a flexible metal hose having a series of annular bellows-like outwardly and inwardly projecting folds, each fold forming a continuous closed ring about the hose, a rigid conical reinforcing member surrounding said hose adjacent the end of said hose, said hose having an outer portion on the outer side of said conical reinforcing member flattened to form a seat and having an inner fold on the inner side of said conical reinforcing member flattened against said conical reinforcing member to hold said conical reinforcing member clamped between the two flattened portions of said hose, said conical reinforcing member projecting beyond the outline of said hose and forming a supporting portion, a tubular coupling member encircling the end of the hose and having an annular internal shoulder directly engaging the supporting portion of said conical reinforcing member to thereby support said conical reinforcing member, and a second coupling member screwed into said tubular coupling member and having an end directly engaging and seating upon the outer flattened portion of said hose.

JOSEPH PETER EASTMAN.